(12) United States Patent
Harnæs et al.

(10) Patent No.: US 6,640,534 B1
(45) Date of Patent: Nov. 4, 2003

(54) CHAIN JOINT ASSEMBLY AND A METHOD FOR THE MANUFACTURE THEREOF

(75) Inventors: Jesper Harnæs, Copenhagen (DK); Stig Mathiesen, Virum (DK)

(73) Assignee: VKR Holding A/S, Søborg (DK)

( * ) Notice: Subject to any disclaimer, the term of this patent is extended or adjusted under 35 U.S.C. 154(b) by 0 days.

(21) Appl. No.: 10/111,675

(22) PCT Filed: Oct. 25, 2000

(86) PCT No.: PCT/DK00/00592

§ 371 (c)(1),
(2), (4) Date: Apr. 26, 2002

(87) PCT Pub. No.: WO01/31228

PCT Pub. Date: May 3, 2001

(30) Foreign Application Priority Data

Oct. 27, 1999 (DK) .......... 1999 01532

(51) Int. Cl.⁷ .......... F16G 13/06; B21L 9/02
(52) U.S. Cl. .......... 59/5; 59/4; 59/6; 59/8; 59/35.1
(58) Field of Search .......... 59/4–8, 35.1

(56) References Cited

U.S. PATENT DOCUMENTS

| | | | |
|---|---|---|---|
| 1,402,766 A | | 1/1922 | Hay |
| 3,153,897 A | * | 10/1964 | Kummerer et al. .......... 59/8 |
| 3,302,388 A | | 2/1967 | Gentsch |
| 3,699,637 A | * | 10/1972 | Rosiek .......... 29/432.1 |
| 4,125,298 A | * | 11/1978 | Heurich et al. .......... 384/537 |
| 5,201,171 A | * | 4/1993 | Anderton et al. .......... 59/7 |
| 6,270,173 B1 | * | 8/2001 | Hashimoto et al. .......... 59/7 |
| 6,457,304 B1 | * | 10/2002 | Bedford et al. .......... 59/7 |

FOREIGN PATENT DOCUMENTS

| | | |
|---|---|---|
| DE | 2622602 A | 12/1976 |
| DE | 19705019 A | 9/1997 |
| FR | 389979 A | 9/1908 |
| GB | 838115 A | 6/1960 |

* cited by examiner

*Primary Examiner*—David B Jones
(74) *Attorney, Agent, or Firm*—Venable LLP; John P. Shannon

(57) ABSTRACT

A chain with mutually connected chain links (1, 2) each comprising a back portion and two parallel wall portions protruding substantially perpendicularly therefrom, in which wall portions corresponding rivet holes have been provided in each of the two and members of the chain link, wherein the chain links (1, 2) are connected with one another by means of an end member of a chain link with a comparatively narrow (2) back portion which is inserted into an end member of a neighbouring chain link with a comparatively broad back portion (1) such that the rivet holes (1c, 2c) in the parallel wall portions of the two end members (1a, 1b, 2a–2b) are positioned opposite one another for engaging a river (3) or a shaft member. By use of rivets or shaft members of such a length that the rivet (3) may be axially retained by deformation of areas of said wall portions (1a–1b) around the rivet holes (1c) from the exterior side for reducing the clear opening of the rivet holes, a chain is produced by use of less material and at subsequently reduced costs relative to chains hitherto known.

5 Claims, 1 Drawing Sheet

CHAIN JOINT ASSEMBLY AND A METHOD FOR THE MANUFACTURE THEREOF

The present invention relates to a chain and a method for the manufacture of a chain by riveting, said chain consisting of mutually connected chain links, each comprising a back portion and two parallel wall portions protruding substantially perpendicularly therefrom, in which wall portions corresponding rivet holes have been provided in each of the two end members of the chain link, wherein the chain links are connected with one another by means of an end member of a chain link with a comparatively narrow back portion which is inserted into an end member of a neighbouring chain link with a comparatively broad back portion such that the rivet holes in the parallel wall portions of the two end members are positioned opposite one another for engaging a rivet or a shaft member.

It is known from U.S. Pat. No. 3,302,288 to manufacture chains by riveting, the ends of the rivet being deformed such that the rivet is retained in the axial direction.

It is a drawback of this prior art that comparatively long rivets have to be used, said rivets protruding beyond said parallel wall portions in the broad chain links, or the heads thereof subsequently having to be pressed into the wall portions, and, consequently, fairly much material is to be used for these rivets. At the same time, it is in several connections a disadvantage that the exterior of such a chain is not smooth, or that the chain links are substantially broader than necessary.

DE A1 197 05 019 discloses a chain with alternating broad and narrow chain links which are pivotally connected with hinge pins inserted into holes in the chain links. The ends of the hinge pins are flush with the exterior sides of the broad chain links and are welded thereto. In an alternative embodiment no holes are provided in the broad chain links, and the hinge pins are welded to the interior side of the broad chain links.

From DE 26 22 602 B2 a chain is likewise known, in which hinge pins are welded onto the side members.

It is a drawback of this prior art that welding is used for retaining the hinge pins in axial direction, as this from a technical point of view is difficult and costly in manufacture.

An object of the invention is to provide a chain and a method for the manufacture of chains by riveting, which chains do not suffer from the above drawbacks.

This object is met by means of a chain which is characterized in that the rivet or the shaft member has such length that the rivet may be axially retained by deformation of areas of said wall portions around the rivet holes from the exterior side for reducing the clear opening of the rivet holes.

Figure 1:
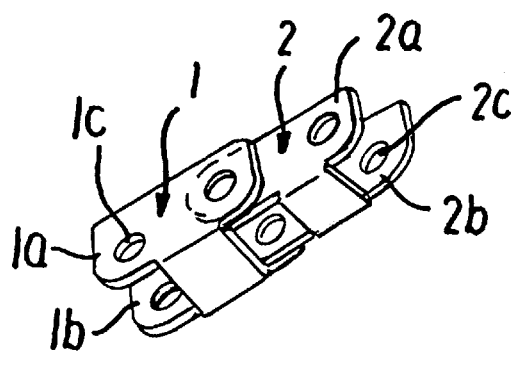
Figure 2:
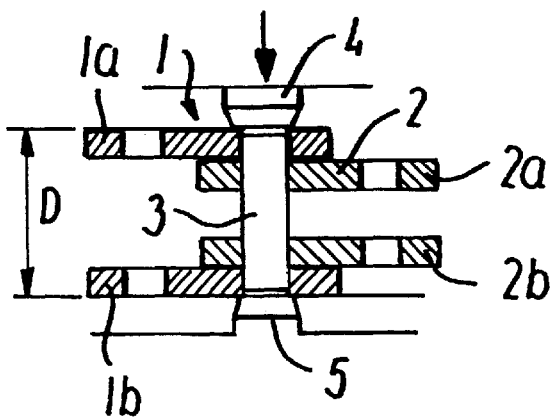

The invention will now be explained in detail in the following with reference to the schematic drawing, in which FIG. 1 is a perspective view of a chain link according to the invention, seen obliquely from below, FIG. 2 is a longitudinal sectional view of a chain link during manufacture, FIG. 3 a view of a chain link with identical links, and FIG. 4 wall portions with bores around the rivet holes.

In FIG. 1 a broad chain link 1 is shown with parallel wall portions 1a and 1b and a narrow chain link 2 with parallel wall portions 2a and 2b. The narrow chain link 2 is inserted between the parallel wall portions 1a and 1b of the broad chain link 1.

FIG. 2 shows how a rivet 3 of shorter length than the distance D between the exterior sides of the wall portions 1a–1b of the broad chain link 1 has been inserted through aligned rivet holes 1c, 2c, respectively, in the wall portions 1a–1b and 2a–2b. Subsequently, the wall portions 1a–1b of the broad chain link 1 is deformed from the exterior side, edge portions around the rivet holes 1c being depressed for reducing the clear opening of the rivet holes and for retaining the rivet in axial direction. The deformation may be made by impact or any other ordinary type of deformation technique, for instance embossing, on the wall portion 1a of the broad chain link with an embossing head 4, the wall portion 1b being in abutment against a corresponding stationary embossing head 5.

The deformation may advantageously be made with an embossing head provided with a number of pointed, arched segments consisting of two embossing surfaces. The first embossing surface of the embossing head at its biggest radius may advantageously be designed as a surface which during the embossing is substantially perpendicular to the exterior side of the wall portions 1a–1b. The second embossing surface of the embossing head may advantageously be designed as a surface which during the embossing forms an angle of for instance 45° C. with the exterior side of the wall portions 1a–1b. Another possibility would be to manufacture the embossing head as a circular segment.

Figure 3:
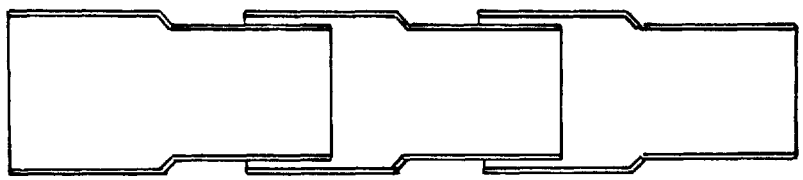

The chain link shown in FIG. 3 is an alternative embodiment, in which the chain links have a narrow and a broad end, all chain links being thus identical.

Figure 4:
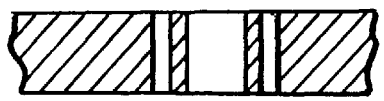
Figure 4:

FIG. 4 shows an alternative to deformation of the edge areas, where, in the wall portion in the immediate vicinity of the rivet holes, depressions or throughgoing holes are provided, for instance in the form of an arch or of a circular form, which holes for instance by use of a suitable mandrel may be used for reduction of the clear opening of the rivet holes and thus result in a compression around the rivet.

The rivet may have such a length that it only just reaches from one wall portion to the second one, or it may be so broad that it reaches from the exterior side of one wall portion to the exterior side of the second wall portion. Another possible embodiment of the rivet would be to provide it, irrespective of its length, with a chamfer or the like at its end faces in order to ensure sufficient space for the material surplus resulting from the deformation of the wall portion of the chain link.

What is claimed is:

1. A chain comprising a plurality of chain links and rivets, each chain link having a back portion and two parallel wall portions extending at substantially right angles from the back portion, said wall portions having substantially flat exterior sides, wherein each chain link has end portions having portions of the parallel wall portions and rivet holes, wherein the end portions of each chain link overlap end portions of adjacent chain links to form a connection, one of the overlapping end portions of each connection defining an inner end portion and the other of the overlapping end portions of each connection defining an outer end portion, wherein the rivet holes of the overlapping end portions of each connection are in alignment with one another, wherein one of the rivets is positioned in the aligned rivet holes of the overlapping end portions of each connection, said rivet having a length not exceeding a distance between the exterior sides of the outer end portions of the parallel wall portions, wherein deformations of areas of the wall portions of the outer end portion of each connection adjacent the rivet holes of the outer end portion narrow the rivet holes of the outer end portion and axially retain the rivet.

2. A chain according to claim 1, wherein the chain comprises a plurality of first chain links alternating with a plurality of second chain links, the end portions of each first chain link being narrower than the end portions of each second chain link.

3. A chain according to claim 1, wherein each chain link has a first end portion and a second end portion narrower than the first end portion, the first end portion forming the outer end portion of each connection, and the second end portion forming the inner end portion of each connection.

4. A method for the manufacture of a chain, comprising the steps of:

providing chain links each comprising a back portion, two parallel wall portions extending at substantially right angles from the back portion, and end portions with rivet holes, the wall portions having substantially flat exterior sides, overlapping the end portions of adjacent chain links to form connections such that the rivet holes of overlapping end portions are aligned, the overlapping end portions of each connection forming an outer end portion and an inner end portion, providing for each connection a rivet having a length not exceeding a distance between said exterior sides of the outer end portion, inserting the rivet through aligned rivet holes of the overlapping end portions of adjacent chain links at each connection, and deforming areas of the outer end portion adjacent the rivet holes of the outer end portion at each connection to reduce the rivet holes to axially retain the rivet.

5. A method according to claim 4, wherein the deforming step includes impacting the outer end members of one of the parallel wall portions at each connection with an embossing head, the outer end member of the other parallel wall portion at each connection being brought into abutment on a stationary embossing head.

* * * * *